United States Patent [19]
Kamber et al.

[11] Patent Number: 5,634,327
[45] Date of Patent: Jun. 3, 1997

[54] METHOD OF OPERATING A GAS-TURBINE GROUP

[75] Inventors: Peter Kamber, Simsbury, Conn.; Anders Lindvall, Baden; Peter Rufli, Fislisbach, both of Switzerland

[73] Assignee: Asea Brown Boveri AG, Baden, Switzerland

[21] Appl. No.: 552,958

[22] Filed: Nov. 3, 1995

[30] Foreign Application Priority Data

Dec. 24, 1994 [DE] Germany ................... 44 46 610.2

[51] Int. Cl.$^6$ ................................................ F02C 9/54
[52] U.S. Cl. .................. 60/39.03; 60/39.04; 60/39.17; 60/39.27
[58] Field of Search ................... 60/39.03, 39.04, 60/39.17, 39.27

[56] References Cited

U.S. PATENT DOCUMENTS

| | | | |
|---|---|---|---|
| 2,544,235 | 3/1951 | Pfenninger | 60/39.17 |
| 2,605,610 | 8/1952 | Hermitte et al. | 60/39.17 |
| 2,654,217 | 10/1953 | Rettaliata | 60/39.17 |
| 4,270,342 | 6/1981 | Zaugg | 60/39.04 |
| 4,529,887 | 7/1985 | Johnson | 290/40 R |
| 5,454,220 | 10/1995 | Althaus et al. | 60/39.04 |
| 5,481,865 | 1/1996 | Frutschi | 60/39.03 |

*Primary Examiner*—Louis J. Casaregola
*Attorney, Agent, or Firm*—Burns, Doane, Swecker & Mathis, L.L.P.

[57] ABSTRACT

In a method of operating a gas-turbine group having sequential combustion, action is taken first of all on the inlet temperatures (A, B) at the two turbines (6, 10) in order to provide a partial-load operation. The subsequent lowering of the load takes place by adjustment of the compressor guide blades (C), that is, by reducing the mass flow (E) to below 50% of the rated load (X). During this lowering, the inlet temperature (A) at the first turbine (6) is kept constant, while the other inlet temperature (B) at the second turbine (10) is continuously lowered; the outlet temperature (D) of the second turbine (10) is in contrast kept constant. After the lowering of the load is complete by adjusting the compressor guide blades, the inlet temperatures (A, B) are reduced directly or in a phase-displaced manner (Y).

5 Claims, 1 Drawing Sheet

METHOD OF OPERATING A GAS-TURBINE GROUP

BACKGROUND OF THE INVENTION

1. Field of the Invention

The present invention relates to a method for regulating a gas turbine apparatus in part load operation.

2. Discussion of Background

It has become known to effect the partial load during operation of gas turbine groups via a reduction in the fuel quantity in which the inlet temperature at the turbine is lowered by such a reduction while maintaining the combustion air. This simple provision per se of a partial-load operation proves to be too unattractive with regard to the efficiency, since the efficiency falls almost in proportion to the power reduction. In the attempt to keep this relatively high efficiency loss within narrower limits, it has already been proposed, for example, to additionally assist the lowering of the load by an adjustment of the compressor guide blades.

However, in a gas-turbine group having sequential combustion, in which the hot gases prepared in a first combustion chamber act upon a first turbine, the exhaust gases flowing out of the latter are again processed in a second combustion chamber to form hot gases which then act upon a second turbine, the requirements for providing a partial-load operation at maximized efficiency by the methods which have been disclosed can no longer be met, all the more if the second combustion chamber is designed for self-ignition, i.e. if the temperature of the exhaust gases from the first turbine has to make possible self-ignition in connection with the fuel injected there.

In such a gas-turbine group, but not only in such a gas-turbine group, the output could certainly be lowered by closing the inlet guide row of the compressor. But this would inevitably necessitate a reduction in the injected fuel quantity to the two combustion chambers of the gas-turbine group. Now if the second combustion chamber is designed for self-ignition, the fuel quantities cannot be reduced simultaneously at both combustion chambers, for the temperature of the exhaust gases from the first turbine could then no longer be maintained for the subsequent self-ignition in the second combustion chamber.

SUMMARY OF THE INVENTION

Accordingly, one object of the invention as defined in the claims, in a method of the type mentioned at the beginning, is to provide a novel regulating method which, by a simple regulating concept, permits reliable lowering of the load at maximized efficiency and minimized pollutant emissions, in particular as far as the NOx and CO emissions are concerned, while allowing for the fact that the gas-turbine group has sequential combustion.

The essential advantage of the invention can be seen in the fact that the entire lowering of the load takes place at maximized partial-load efficiency, in which case, upon initiation of the lowering of the load, action is taken at the outset on the inlet temperature at the two turbines in such a way that a safety margin is thereby created in order to be able to withstand undamaged overshooting of the temperatures caused by regulating influences.

This action taken on the temperature upon initiation of the lowering of the load certainly presupposes that the temperature rated for self-ignition in the second combustion chamber does not drop below the level required for operation.

The adjustment of the compressor guide blades is in operative connection with the fuel regulation during the lowering of the load, this fuel regulation in turn being dependent upon the decreasing mass flow from the adjustment of the compressor guide blades.

The operative connection between adjustment of the compressor guide blades and fuel regulating opens up advantageous possibilities in the regulation of such a gas-turbine group:

At an initial position of a load of 100%, which corresponds to the nominal temperature at the inlet to the two turbines and the nominal opening of the compressor guide blades, the load is reduced by a few percent, in accordance with a lowering of the temperature by 20° C. This first action involves creating a safety margin relative to the 100% load so that any following fuel regulating or other actions do not cause overshooting of the temperatures. This setting is established on account of the maximum temperature, taken as a basis, of the exhaust gases from the second turbine, which according to specification is 620°–640° C. The compressor guide blades are then closed successively until below 50% of the rated load, the temperature at the inlet to the first turbine being held during this regulation at the reduced level relative to the temperature at rated load. The inlet temperature at the second turbine decreases continuously, it being ensured that the temperature at the outlet of this second turbine does not exceed the aforesaid specification. So that the new regulation state can arise from the preceding actions, the fuel quantities to the individual combustion chambers must be suitably reduced, since the mass flow continually decreases due to the adjustment of the compressor guide blades. After the adjustment of the compressor guide blades is complete, the inlet temperature at the first turbine is kept constant for a while at the predetermined level, while the inlet temperature at the second turbine is continuously reduced. As soon as the remaining load of the second turbine has decreased by about half, the inlet temperature at the first turbine is likewise continuously reduced by appropriate lowering of the fuel quantity.

To further protect the operation of the self-igniting combustion chamber, a temperature measurement can be provided at the outlet of the first turbine, which temperature measurement provides information in order to influence the fuel quantity for the second combustion chamber if need be.

If the gas-turbine group is supplemented by a downstream steam circuit a combined plant, the load can be lowered further at high efficiency by preheating the intake air to the compressor by means of bled steam from the said steam circuit after final adjustment of the compressor guide blades.

Advantageous and convenient further developments of the achievement of the object according to the invention are defined in the further dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
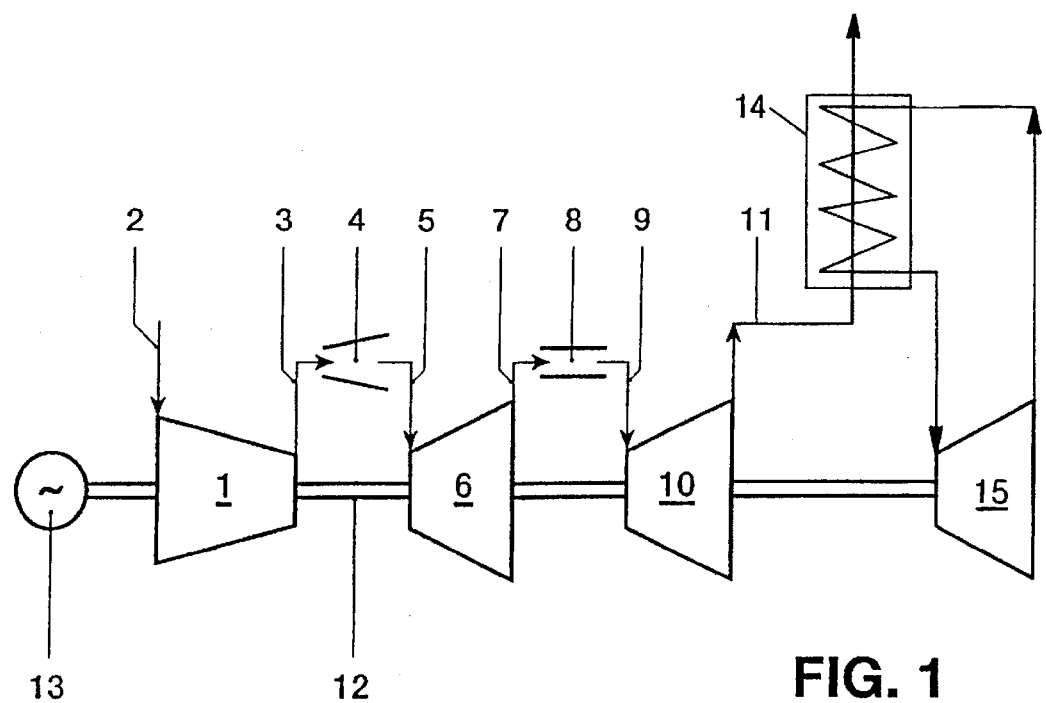
FIG. 1 shows a gas-turbine group having sequential combustion.

Referring now to the drawings, wherein like reference numerals designate identical or corresponding parts throughout the several views, all features not essential for understanding the invention are omitted, and the direction of flow of the media is indicated by arrows, in FIG. 1 a gas-turbine group having sequential combustion is shown. This gas-turbine group consists of a compressor 1, or a compressor unit equipped with intermediate cooling, in which the compression of the intake air 2 takes place. The compressed air 3 then flows into a first combustion chamber 4, also called high-pressure combustion chamber=HP combustion chamber, in which the production of hot gases 5 takes place with the aid of an injected fuel, this combustion chamber preferably being operated with burners as disclosed by U.S. Pat. No. 4,932,861 to Keller et al. This publication is incorporated by reference in the present description. Operating downstream of this HP combustion chamber 4 is a first turbine 6, also called high-pressure turbine=HP turbine, in which the hot gases 5 undergo partial expansion. This partial expansion is defined in that the exhaust gases 7 from the HP turbine 6 still have a relatively high temperature, of the order of magnitude of around 950° C. and above, and accordingly the blading of this HP turbine 6 consists of few moving-blade rows, preferably 1 to 3 stages. Acting downstream of the HP turbine is a second combustion chamber 8, also called low-pressure combustion chamber=LP combustion chamber, which operates according to a self-ignition principle. This LP combustion chamber 8 preferably has the form of an annular throughflow duct into which a fuel is injected which, in connection with the predetermined temperature, forms the preconditions for self-ignition. At a temperature of the exhaust gases 7 from the HP turbine 6 at the aforesaid level, self-ignition inevitably takes place when a gaseous fuel is used. Furthermore, this LP combustion chamber 8 has vortex generators (not shown) which are preferably arranged upstream of the injection of the fuel and which form a backflow zone in the region of the flame front to guarantee reliable operation. The exhaust gases 7 are thus processed again in the LP combustion chamber 8 to form hot gases 9, the temperature of which approximately corresponds to that of the HP combustion chamber 4. In principle, the temperatures of the hot gases 5, 9 have no direct limit caused by the combustion chamber; on the contrary, this limit is predetermined first of all by the respective turbine to be acted upon and by the corresponding machine elements. The hot gases 9 then act upon a second turbine, also called low-pressure turbine=LP turbine, in which the final expansion takes place. The residual calorific potential of the burnt gases 11 can be used, for example, for the steam generation of a downstream steam circuit (not shown). An essential feature of the gas-turbine group shown is the uniform mounting of all turbo-machines 1, 6, 10 on one shaft 12, which is preferably mounted on two bearings (not shown) and which is coupled to the shaft of the generator 13. The two combustion chambers 4, 8 occupy the intermediate space between the turbo-machines 1, 6, 10; they are preferably designed as annular combustion chambers, the HP combustion chamber 4 being largely superimposed on the compressor 1 in the axial direction in such a way that the compactness of the gas-turbine group is thus increased. This possibility cannot be equally applied in the case of the LP combustion chamber 8 for fluidic reasons; nevertheless, it can be said here that the LP combustion chamber 8 turns out to be very short so that the fluidic aspects are given precedence here.

Figure 2:
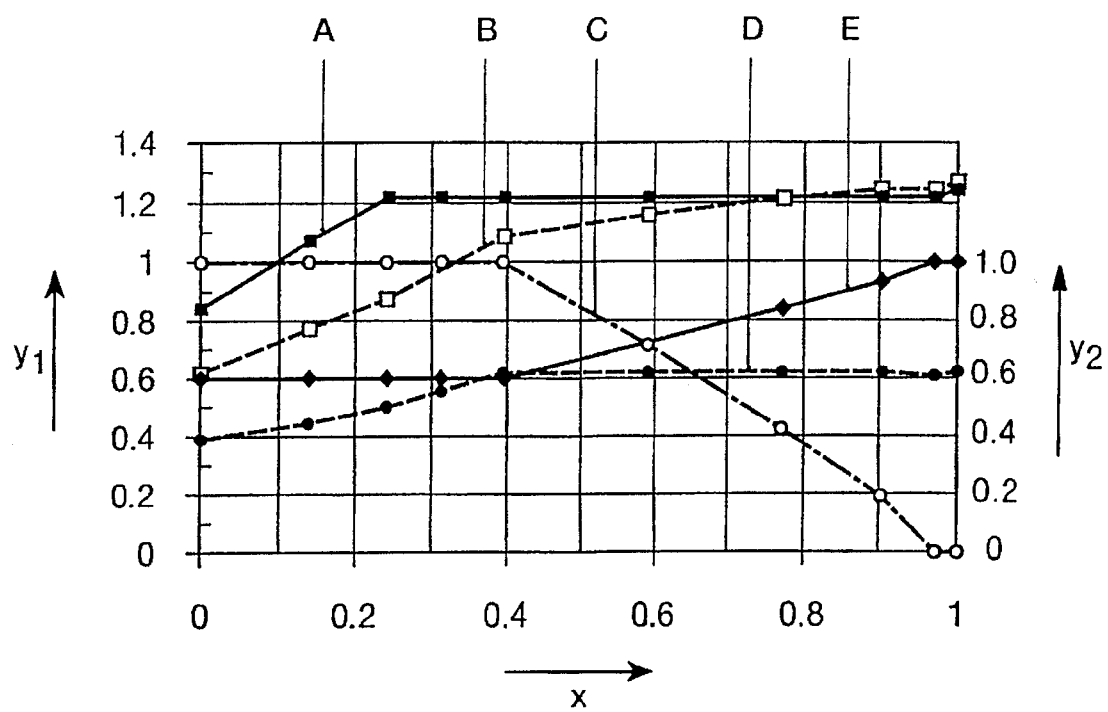
FIG. 2 shows a regulating method for lowering the load.

A regulating method for a gas-turbine group according to FIG. 1 is shown in FIG. 2, where:

X=Load in %
Y1=Temperatures in °C./1000
Y2=ratio of mass flow to mass flow at full load, and a relative change of the guide blade angle to guide blade angle at full load, where 1.0 indicates a maximum angular change
A=Inlet temperature, HP turbine
B=Inlet temperature, LP turbine
C=Guide blade adjustment
D=Outlet temperature, LP turbine
E=Mass flow At an initial position with a load of 100% according to abscissa X, which corresponds to a nominal temperature at the inlet to the two turbines, HP turbine (curve A) and LP turbine (curve B), of about 1250° C., the temperatures of the hot gases are simultaneously reduced by about 20° C., whereby the load then corresponds to about 97% of the rated load. This measure creates an initial position which is directed against negative effects by the regulation on the inlet temperatures at the two turbines. An overshoot resulting therefrom can hereby be absorbed. The said reduction of about 20° C. is derived from the maximum temperature, taken as a basis, of the exhaust gases from the LP turbine of 640° C., which at this point is still 620° C. This temperature must neither be increased nor lowered at random for the time being, for this would call into question, for example, the downstream connection of a steam circuit or jeopardize the technical design of the gas-turbine group. In so far as these temperatures have been reduced, the adjustment of the compressor guide blades comes into action, as curve C shows. During this adjustment, the temperature at the inlet of the HP turbine is kept constant, as the further run of curve A shows. The successive adjustment of the compressor guide blades according to curve C is run down to a load of 40%. In the process, the inlet temperature at the LP turbine according to curve B decreases in such a way that it is still about 1100° C. at 40% load. In contrast, the outlet temperature at the LP turbine according to curve D stays constant. With the adjustment of the compressor guide blades according to curve C, the mass flow according to curve E decreases continuously. So that the new regulation state can arise from the actions described up to now, the fuel quantities to the individual combustion chambers, in each case upstream of the two turbines, must logically be reduced in accordance with the reduction in the mass flow. Below 40% load no further adjustment of the compressor guide blades takes place, as curve C shows. In this load region the guide blades also come against a stop, and accordingly there is also no further reduction in the mass flow E. The inlet temperature A at the HP turbine continues to remain constant, down to a load region of about 25%, i.e. down to this load this inlet temperature stays at a high level, namely 20° C. lower than the temperature would be at 100% load. By further lowering of the fuel quantity for the combustion chamber upstream of the LP turbine, the inlet temperature of the latter is further reduced. The fuel quantity to the second combustion chamber is reduced to zero. From 25% load only the first combustion chamber is still firing. From stoppage of the gas turbine up to about 25% load, the gas turbine is operated only with the first combustion chamber, that is with the HP combustion chamber. The start-up of the gas-turbine group takes the form of a reciprocal mode of operation to the regulating method described.

Since the combustion chamber acting upstream of the LP turbine is designed for self-ignition, a redundant temperature measurement is installed for operational safety, which temperature measurement is designed to the effect that it is taken at the outlet of the HP turbine. A corresponding correction of the fuel quantity for the combustion chamber acting directly upstream is initiated according to demand.

If the gas-turbine group described is supplemented by a steam circuit including, for example, a waste heat boiler 14 receiving the exhaust 11 from the LP turbine 10, and a steam turbine 15 operated by steam generated in the boiler 14, it is of primary importance that the temperature at the outlet of the LP turbine stays at 620° C. if possible down to the lowermost load regions so that the formation of steam for operating a steam turbine can be maintained for as long as possible. The regulating method described is virtually predestined for this purpose, since the outlet temperature of 620° C. at the LP turbine is held down to a load of 40%, as revealed by curve D.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A Method of operating a gas-turbine group for loads less than a rated load, the gas-turbine group comprising a compressor unit, a first combustion chamber which is connected downstream of the compressor unit and connected to deliver heated gases to a first turbine, a second combustion chamber which is connected downstream of the first turbine and connected to deliver heated gases to a second turbine, and at least one generator driven by the turbines, the method comprising the steps of:

reducing a fuel flow amount to the first combustion chamber and a fuel flow amount to the second combustion chamber to lower inlet temperatures at the two turbines for a 5% reduction in the rated load, adjusting an angle of compressor guide blades to reduce the mass flow until the load drops below 50% of the rated load, wherein the fuel flow amount to the first combustion chamber is regulated according to the change in mass flow to maintain substantially constant the inlet temperature at the first turbine and the fuel flow amount to the second combustion chamber is regulated according to the mass flow to lower the inlet temperature at the second turbine so that an outlet temperature of the second turbine does not exceed a rated nominal value, further reducing the fuel flow amount to the second combustion chamber to further lower the inlet temperature at the second turbine after the adjustment of the compressor guide blades is complete and thereafter, further reducing the fuel flow amount to the first combustion chamber to further lower the inlet temperature at the first turbine.

2. The method as claimed in claim 1, wherein the step of lowering the inlet temperature at the second turbine during adjustment of the compressor guide blades is done so that an outlet temperature at the second turbine does not exceed 620°.

3. The method as claimed in claim 1, wherein the second combustion chamber is operated with self-ignition of a fuel.

4. The method as claimed in claim 3, further comprising the step of measuring an outlet temperature at the first turbine and the inlet temperature at the second turbine, and correcting the inlet temperature to be sufficient for self-ignition of a fuel in the second combustion chamber.

5. The method as claimed in claim 1, wherein the gas-turbine group is in operative connection with a steam turbine circuit arranged downstream of the second turbine, wherein, after final adjustment of the compressor guide blades, the load is further lowered by preheating intake air to the compressor using a quantity of steam from the steam turbine circuit.

* * * * *